United States Patent
McGee et al.

(10) Patent No.: US 6,766,098 B1
(45) Date of Patent: Jul. 20, 2004

(54) METHOD AND APPARATUS FOR DETECTING FAST MOTION SCENES

(75) Inventors: Thomas McGee, Garrison, NY (US); Nevenka Dimitrova, Yorktown Heights, NY (US)

(73) Assignee: Koninklijke Philip Electronics N.V., Eindhoven (NL)

(*) Notice: Subject to any disclaimer, the term of this patent is extended or adjusted under 35 U.S.C. 154(b) by 0 days.

(21) Appl. No.: 09/477,084

(22) Filed: Dec. 30, 1999

(51) Int. Cl.[7] .................................... H04N 5/91
(52) U.S. Cl. ........................ 386/46; 348/700; 386/69
(58) Field of Search ...................... 386/46, 69, 52, 386/55, 95, 700, 390.1; 382/107, 232

(56) References Cited

U.S. PATENT DOCUMENTS

| | | | | |
|---|---|---|---|---|
| 4,409,615 A | * | 10/1983 | McMann, Jr. et al. | 378/98.2 |
| 5,508,750 A | * | 4/1996 | Hewlett et al. | 348/558 |
| 5,642,294 A | | 6/1997 | Taniguchi et al. | 364/514 |
| 5,708,480 A | * | 1/1998 | Bromba et al. | 348/620 |
| 5,719,643 A | | 2/1998 | Nakajima | 348/700 |
| 5,731,835 A | * | 3/1998 | Kuchibholta | 348/390.1 |
| 5,732,146 A | * | 3/1998 | Yamada et al. | 382/107 |
| 5,751,378 A | | 5/1998 | Chen et al. | 348/700 |
| 5,767,922 A | * | 6/1998 | Zabih et al. | 348/700 |
| 5,835,163 A | * | 11/1998 | Liou et al. | 348/700 |
| 6,055,025 A | | 4/2000 | Shahraray | 348/700 |
| 6,137,544 A | * | 10/2000 | Dimitrova et al. | 348/700 |
| 6,252,975 B1 | * | 6/2001 | Bozdagi et al. | 382/107 |
| 6,415,056 B1 | * | 7/2002 | Boon | 382/238 |
| 6,417,887 B1 | * | 7/2002 | Yamaji | 348/452 |
| 6,466,697 B1 | * | 10/2002 | Boon | 382/233 |

FOREIGN PATENT DOCUMENTS

| | | |
|---|---|---|
| EP | 0472806 B1 | 3/1992 |
| WO | 9823085 A1 | 5/1998 |

OTHER PUBLICATIONS

"Motion Analysis and Image Sequence Processing", by M. Ibramin Sezal et al., Kluwer Academic Publishers, Boston/London 1993, pp. 1–52 and 89–124.

* cited by examiner

Primary Examiner—Vincent Boccio
Assistant Examiner—James A Fletcher
(74) Attorney, Agent, or Firm—Laurie E. Gathman

(57) ABSTRACT

A video indexing method and device for selecting keyframes from each detected scene in the video. The method and device detects fast motion scenes by counting the number of consecutive scene changes detected.

14 Claims, 6 Drawing Sheets

METHOD AND APPARATUS FOR DETECTING FAST MOTION SCENES

BACKGROUND OF THE INVENTION

1. Field of the Invention

The present invention is in general related to an apparatus that detects scene changes in a source video and selects representative keyframes from each scene. The present invention in particular relates to determining whether a detected scene change is in actuality a scene change or whether a fast motion scene caused a false detection of a scene change.

2. Description of the Prior Art

Users will often record home videos or record television programs, movies, concerts, sports events, etc. on a tape, hard disk or other storage medium for later or repeated viewing. Often, a video will have varied content or be of great length. However, a user may not write down what is recorded on a storage medium and may not remember what she recorded or where on the storage medium particular scenes, movies, events are recorded. Thus, a user may have to sit and view, for example, an entire tape to remember what is on the tape.

Video content analysis uses automatic and semi-automatic methods to extract information that describes content of the recorded material. Video content indexing and analysis extracts structure and meaning from visual cues in the video. Generally, a video clip is taken from a TV program, the Internet or a home video by selecting frames which reflect the different scenes in a video.

In a video indexing scene change detection system described in PHA 23,252, U.S. Ser. No. 08/867,140 a video indexing system is described wherein frames are compared to one another to detect large differences between the frames. If a large difference exists, it is assumed that a scene change has occurred between the two frames. Once the scene change is found, a keyframe is chosen from each scene and the keyframes are arranged to provide a video index. The problem with this system is that during a scene where there is fast motion, such as a car chase scene, the object moving across the scene (e.g. the car) may move from the left hand portion of the frame to the right hand portion of the frame during a plurality of sequential frames. When these frames are compared to each other the prior art system detects a scene change after each frame and selects each frame as a keyframe, when in fact, all frames are from the same scene.

Similarly in PHA 23,477, U.S. Ser. No. 09/123,444 a commercial detection system is disclosed which detects commercials by counting the number of scene changes detected within a time period ("cut rate"). Typically commercials have high cut rates and therefore the cut rate can be used to locate and delete commercials from video. If it is determined that the number of scene changes detected during a certain time period is above a certain threshold then it is assumed that a commercial has been detected. The problem with such a system is that a fast motion scene will also have a high cut rate and will be detected as a commercial and possibly deleted from the video.

SUMMARY OF THE PRESENT INVENTION

Accordingly, a system is desired which will create a visual index for a video source that was previously recorded or while being recorded, which is useable and more accurate in selecting significant keyframes, while providing a useable amount of information for a user. This system will detect scene changes and select a key frame from each scene but ignore the detection of scene changes and the selection of key frames where scene changes are detected consecutively after each frame.

It is an object of the invention to compare two frames of a video to detect a scene change, if consecutive scene changes are detected after each frame for a plurality of frames then it is determined that these scene changes are due to fast motion in the video rather than being true scene changes.

It is another object of the invention to count the number of consecutive scene changes to keep track of the length of the sequence of frames having scene cringes detected after each consecutive frame. At the end of this sequence which contains consecutive scene changes, it is determined that all frames within the sequence are part of the same fast motion scene and only one key frame is selected from the sequence.

It is another object of the invention to distinguish fast motion scenes from commercials by analyzing high cut rate video to determine if scene changes occur after each frame.

For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

For a better understanding of the reference is a made to the following drawings.

DESCRIPTION OF THE PREFERRED EMBODIMENTS

Two phases exist in the video content indexing process: archival and retrieval. During the archival process, video content is analyzed during a video analysis process and a visual index is created. In the video analysis process, automatic significant scene detection, fast motion detection and keyframe selection occur. Significant scene detection is a process of identifying scene changes, i.e., "cuts" (video cut detection or segmentation detection) and identifying static scenes (static scene detection). For each scene detected, a particular representative frame called a keyframe is extracted. Therefore it is important that correct identification of scene changes occurs otherwise there will be too many keyframes chosen for a single scene or not enough key frames chosen for multiple scene changes. Fast motion detection is the process of identifying places in the video where fast motion scene occur and is explained in further detail below. (Most references below are to a source tape although clearly, the source video may be from a file, disk, DVD, other storage means or directly from a transmission source (e.g., while recording a home video).)

Figure 1:
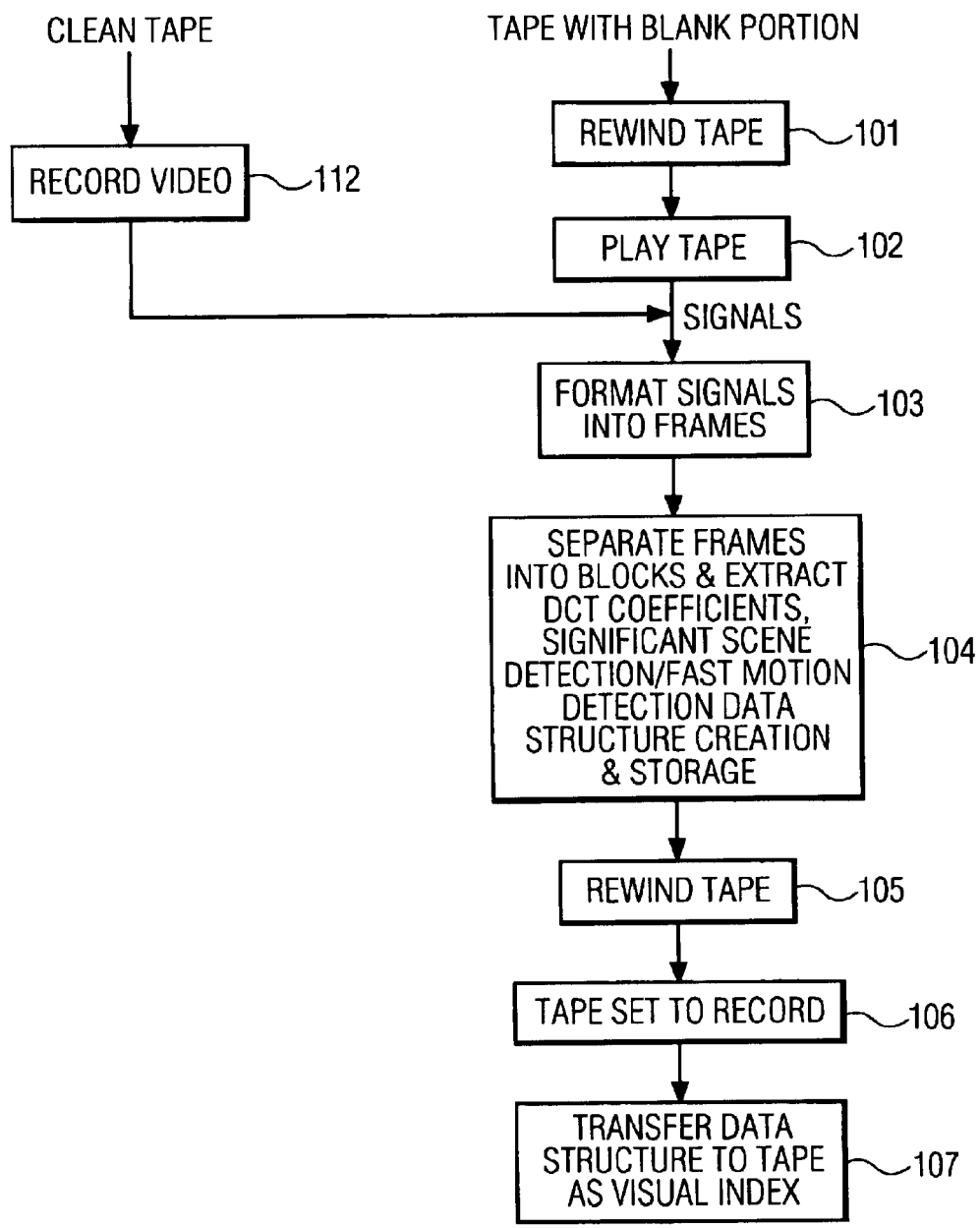
FIG. 1 illustrates a video archival process.

A video archival process is shown in FIG. 1 for a source tape with previously recorded source video, which may include audio and/or text, although a similar process may be followed for other storage devices with previously saved visual information, such as an MPEG file. In this process, a visual index is created based on the source video. A second process, for a source tape on which a user intends to record, creates a visual index simultaneously with the recording.

FIG. 1 illustrates an example of the first process (for previously recorded source tape) for a videotape. In step 101, the source video is rewound, if required, by a playback/recording device such as a VCR. In step 102, the source video is played back. Signals from the source video are received by a television, a VCR or other processing device. In step 103, a media processor in the processing device or an external processor, receives the video signals and formats the video signals into frames representing pixel data (frame grabbing).

In step 104, a host processor separates each frame into blocks, and transforms the blocks and their associated data to create DCT (discrete cosine transform) coefficients; performs significant scene detection, fast motion detection and keyframe selection; and builds and stores keyframes as a data structure in a memory, disk or other storage medium. In step 105, the source tape is rewound to its beginning and in step 106, the source tape is set to record information. In step 107, the data structure is transferred from the memory to the source tape, creating the visual index. The tape may then be rewound to view the visual index.

The above process is slightly altered when a user wishes to create a visual index on a tape while recording. Instead of steps 101 and 102, as shown in step 112 of FIG. 1, the frame grabbing process of step 103 occurs as the video (film, etc.) is being recorded.

Figure 2A:
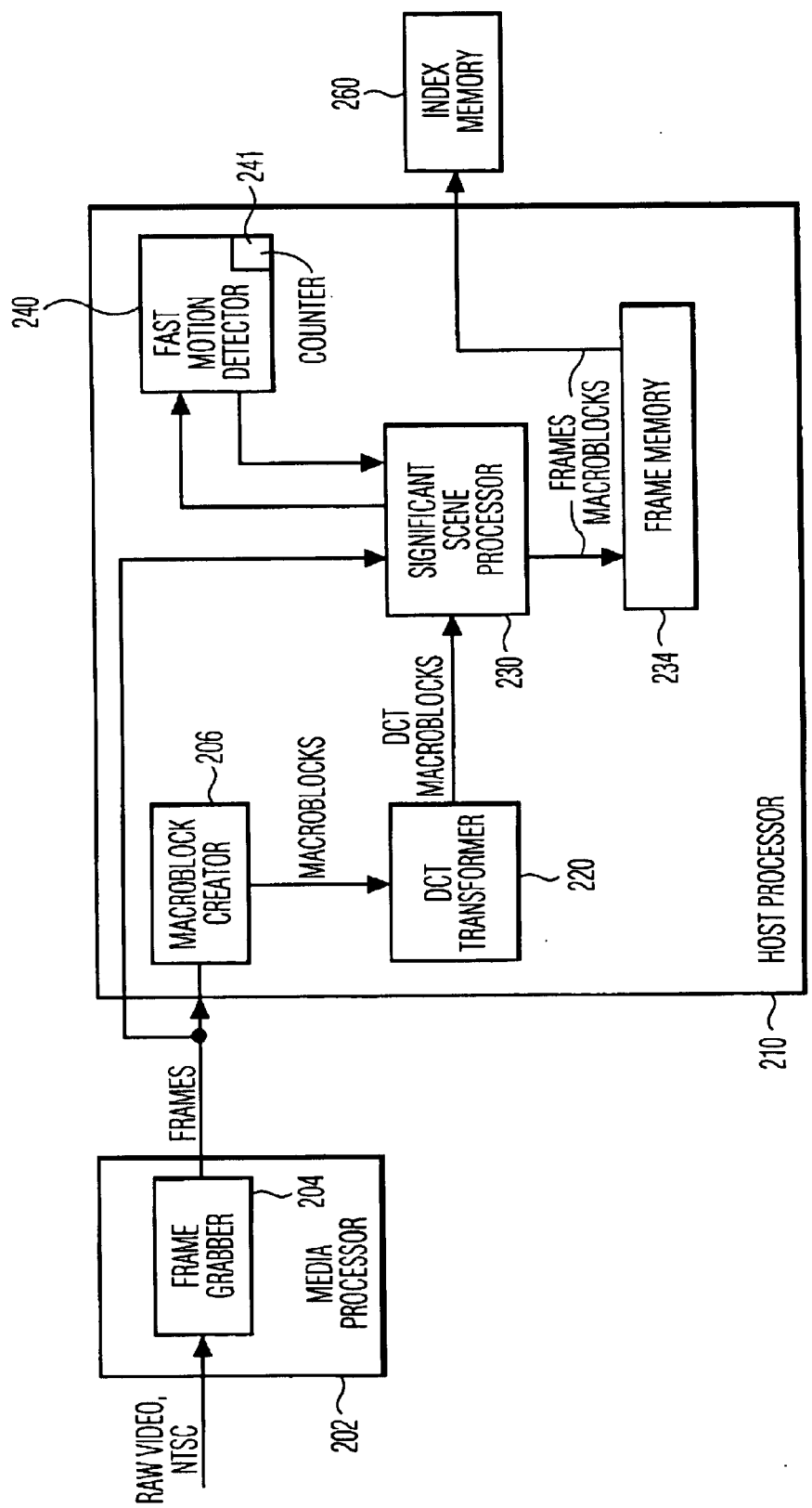
FIGS. 2A and 2B are block diagrams of devices used in creating a visual index in accordance with a preferred embodiment of the invention.
Figure 2B:
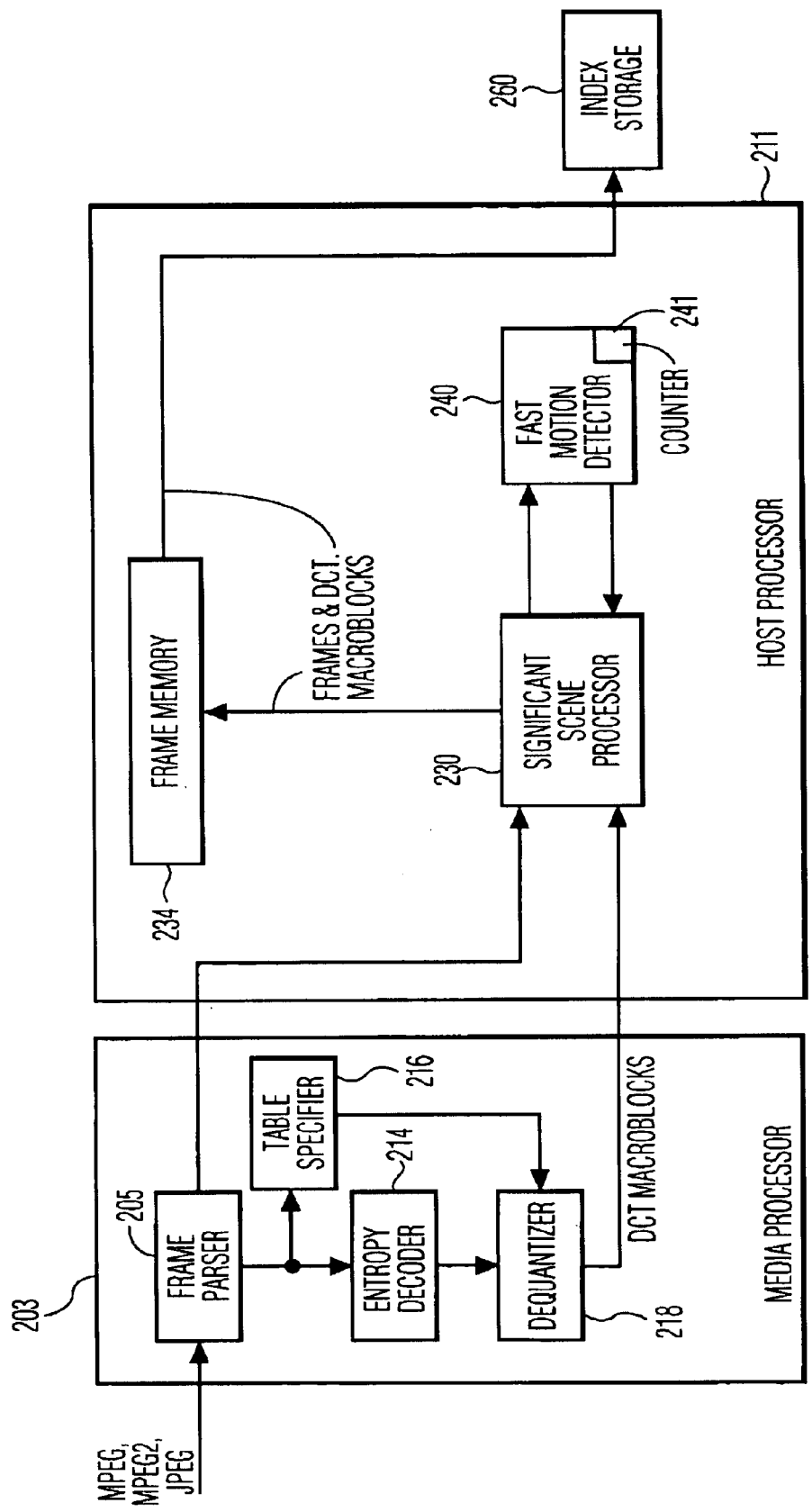

Steps 103 and 104 are more specifically illustrated in FIGS. 2A and 2B. Video exists either in analog (continuous data) or digital (discrete data) form. The present example operates in the digital domain and thus uses digital form for processing. The source video or video signal is a series of individual images or video frames displayed at a rate high enough (in this example 30 frames per second) so the displayed sequence of images appears as a continuous picture stream. These video frames may be uncompressed (NTSC or raw video) or compressed data in a format such as MPEG, MPEG 2, MPEG 4, Motion JPEG or such.

Figure 3:
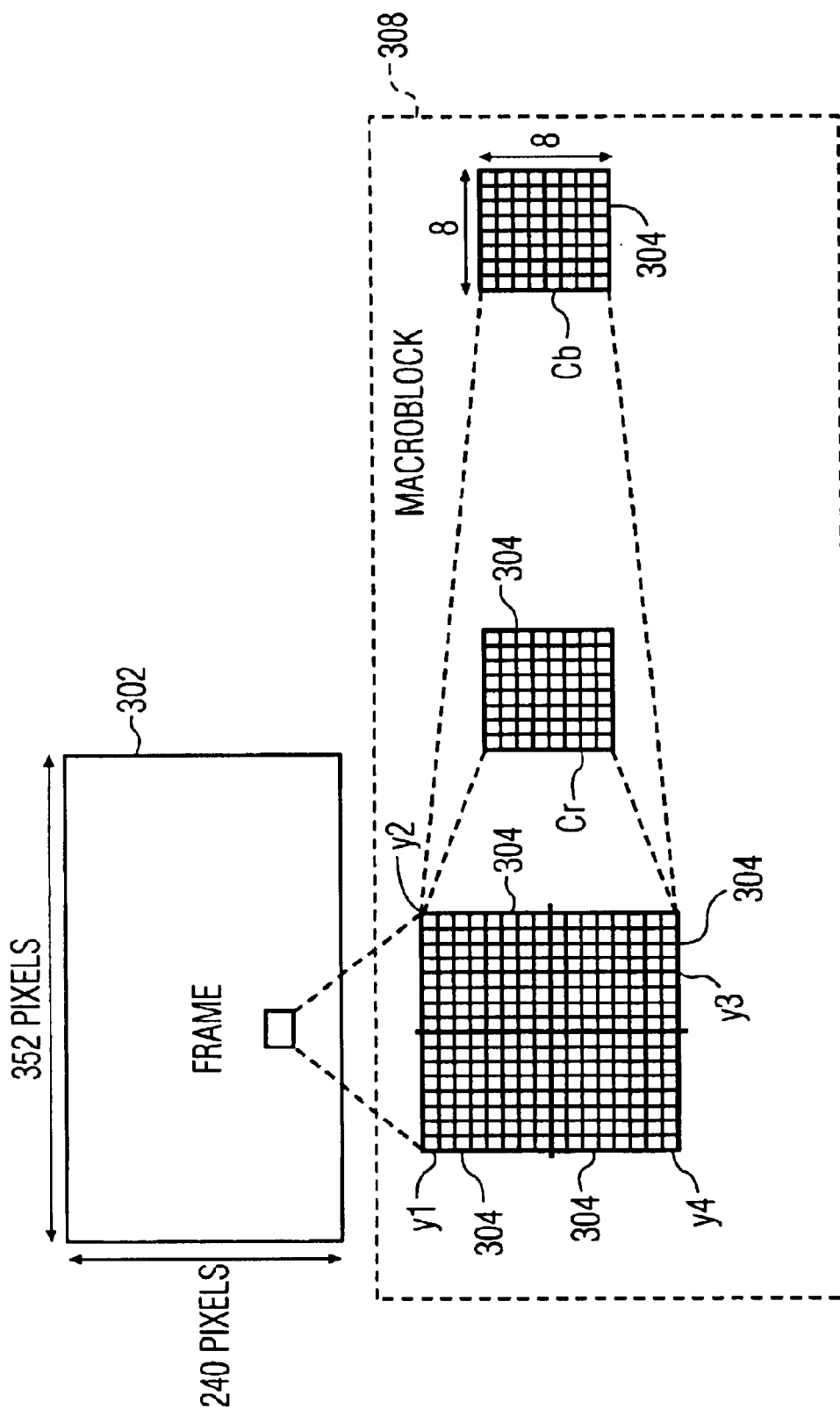
FIG. 3 illustrates a frame, a macroblock, and several blocks.

The information in an uncompressed video is first segmented into frames in a media processor 202, using a frame grabbing technique 204 such as present on the Intel® Smart Video Recorder III. Although other frame sizes are available, in this example shown in FIG. 3, a frame 302 represents one television, video, or other visual image and includes 352×240 pixels.

The frames 302 are each broken into blocks 304 of, in this example, 8×8 pixels in the host processor 210 (FIG. 2A). Using these blocks 304 and a popular broadcast standard, CCIR-601, a macroblock creator 206 (FIG. 2A) creates luminance blocks and sub samples color information to create chrominance blocks. The luminance and chrominance blocks form a macroblock 308. In this example, 4:2:0 is being used although other formats such as 4:1:1 and 4:2:2 could easily be used by one skilled in the art. In 4:2:0, a macroblock 308 has six blocks, four luminance, Y1, Y2, Y3, and Y4; and two chrominance Cr and Cb, each block within a macroblock being 8×8 pixels.

The video signal may also represent a compressed image using a compression standard such as Motion JPEG (Joint Photographic Experts Group) and MPEG (Motion Pictures Experts Group). If the signal is an MPEG or other compressed signal, as shown in FIG. 2B the MPEG signal is broken into frames using a frame or bitstream parsing technique by a frame parser 205. The frames are then sent to an entropy decoder 214 in the media processor 203 and to a table specifier 216. The entropy decoder 214 decodes the MPEG signal using data from the table specifier 216, using, for example, Huffman decoding, or another decoding technique.

The decoded signal is next supplied to a dequantizer 218 which dequantizes the decoded signal using data from the table specifier 216. Although shown as occurring in the media processor 203, these steps (steps 214–218) may occur in either the media processor 203, host processor 211 or even another external device depending upon the devices used.

Alternatively, if a system has encoding capability (in the media processor, for example) that allows access at different stages of the processing, the DCT coefficients could be delivered directly to the host processor. In all these approaches, processing may be performed in real time.

In step 104 of FIG. 1, the host processor 210, which may be, for example, an Intel® Pentium™ chip or other processor or multiprocessor, a Philips® Trimedia™ chip or any other multimedia processor; a computer; an enhanced VCR, record/playback device, or television; or any other processor, performs significant scene detection, key frame selection, and building and storing a data structure in an index memory, such as, for example, a hard disk, file, tape, DVD, or other storage medium. Significant Scene Detection/Fast Motion Detection: For automatic significant scene detection, the present invention attempts to detect when a scene of a video has changed or a static scene has occurred. A scene may represent one or more related images. In significant scene detection, two consecutive frames are compared and, if the frames are determined to be significantly different, a scene change is determined to have occurred between the two frames; and if determined to be significantly alike, processing is performed to determine if a static scene has occurred. In fast motion detection, if a scene change has been detected after each frame for a sequence of consecutive frames then a fast motion scene has been detected. This determination is made because a director would never have consecutive scene changes within the bounds perceivable by the human eye and therefore these detections must be erroneous detections of scene changes (but see PHA 23,873, U.S. Ser. No. 09/477,083 by the same inventors and filed concurrently with the present application which identifies a false frame in video). In such a sequence of frames only one keyframe from this sequence is chosen since this sequence in all likelihood represents a single fast motion scene.

Figure 6:
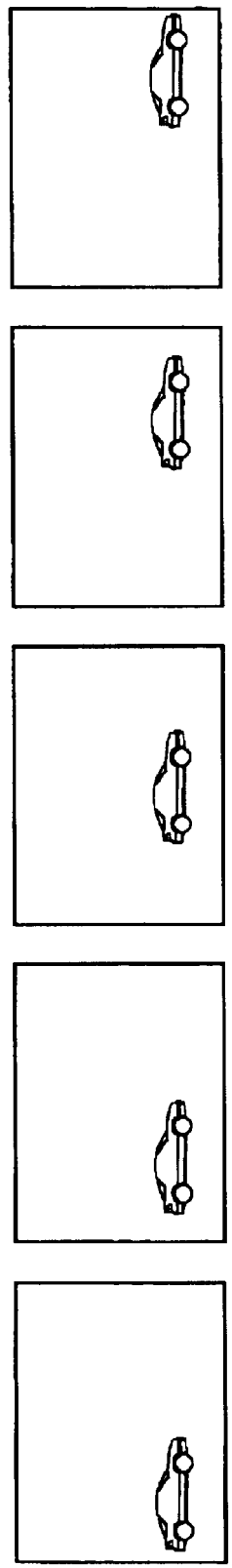
FIG. 6 illustrates a stream of video having a fast motion scene.

The reason why a substantial difference is detected between two frames of a fast motion sequence is as follows. Suppose the fast motion scene is a motorcycle chase or car chase as shown in FIG. 6. As the car moves across the scene it may move from the left-hand portion of the first frame towards the left center of the second frame and then towards the center of the third frame and towards the right center of the fourth frame and towards the right hand portion of the fifth frame. When the first frame is compared to the second frame a scene change is detected since the change in location of the car in the first and second frames causes the detection of a substantial difference between the two frames. The same is true for the comparison between the second and third frames, the third and fourth frames and the fourth and fifth frames. Instead of a new scene being detected after each frame and a keyframe chosen from each frame, the present invention detects the consecutive scene changes and treats all frames within the sequence, as images from the same scene.

Similarly, in commercial detection as described in PHA 23,477, U.S. Ser. No. 09/123,444 the number of scene changes detected within a certain time frame is compared to a threshold. If the number of scene changes is above the threshold then a commercial is determined to be detected. This analysis is based on the fact that commercials typically have many scene changes during a short period of time ("high cut rate"). The problem with this conclusion being made is that fast motion scenes also have a high cut rate. If the commercials are being detected for removal, then there is a high likelihood that some fast motion scenes may also be removed due to their high cut rate. In a preferred embodiment of the instant invention all high cut rate scene are looked at closely to determine whether the scene changes occur consecutively after each frame, if so, then a commercial has not been detected but instead a fast motion scene has been detected. This conclusion is again based on the fact that a director would never create multiple scene changes within the time period perceivable by the human eye, even if it is a commercial sequence.

The present method and device uses comparisons of DCT (Discrete Cosine Transform) coefficients to detect scene changes, but any other cut detection method, wavelets, histograms etc. can also be used. First, each received frame 302 is processed individually in the host processor 210 to create 8×8 blocks 440. The host processor 210 processes each 8×8 block which contains spatial information, using a discrete cosine transformer 220 to extract DCT coefficients and create the macroblock 308.

When the video signal is received in a compressed video format such as MPEG, the DCT coefficients may be extracted after dequantization and need not be processed by a discrete cosine transformer. Additionally, as previously discussed, DCT coefficients may be automatically extracted depending upon the devices used.

Figure 4:
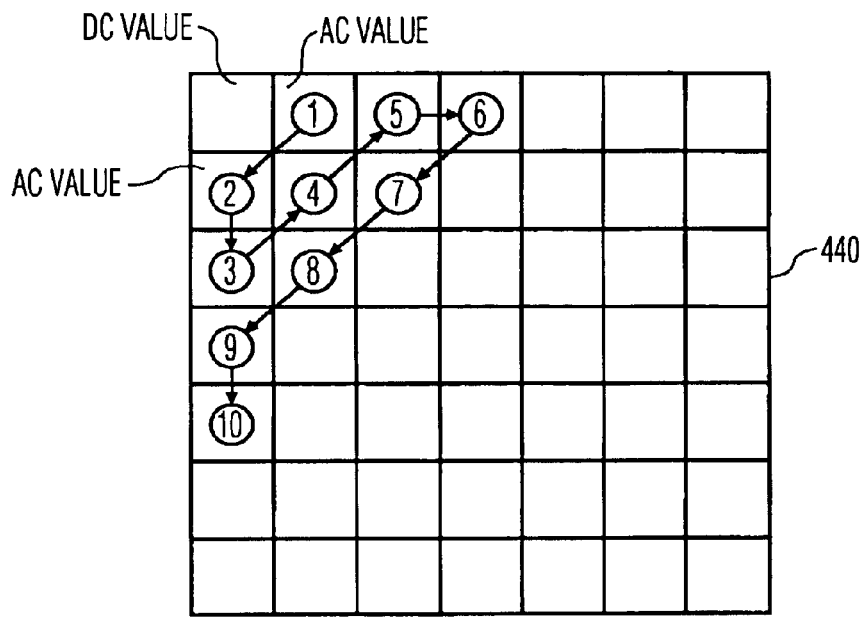
FIG. 4 illustrates several DCT coefficients of a block.
Figure 5:
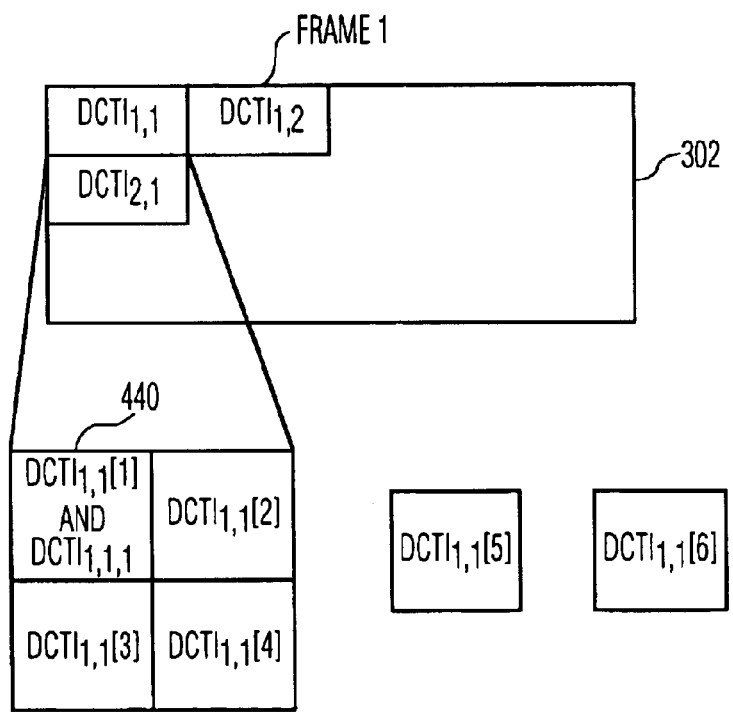
FIG. 5 illustrates a macroblock and several blocks with DCT coefficients.

The DCT transformer provides each of the blocks 440 (FIG. 4), Y1, Y2, Y3, Y4, Cr and Cb with DCT coefficient values. According to this standard, the uppermost left hand corner of each block contains DC information (DC value) and the remaining DCT coefficients contain AC information (AC values). The AC values increase in frequency in a zig-zag order from the right of the DC value, to the DCT coefficient just beneath the DC value, as partially shown in FIG. 4. The Y values are the luminance values.

In the scene change detection method of the instant invention, processing is limited to detecting the change in DC values between corresponding blocks of two frames to more quickly produce results and limit processing without a significant loss in efficiency; however, clearly one skilled in the art could compare the difference in the luminance values of corresponding macroblocks, blocks or any other method such as histogram, wavelet etc. which detects a change in luminance. If the differences are above a certain threshold then a determination is made that a scene change has occurred.

A scene change detection device is disclosed in PHA 23252, U.S. Ser. No. 08/867,140 hereby incorporated by reference. In this prior art invention, a comparison of the DCT coefficients of each frame with respective coefficients in an adjacent frame are made. If there is significant change between respective coefficients (which will happen as the car moves across the scene) it is determined that a scene change has occurred between the two frames. In a video indexing system, this causes a keyframe to be chosen from each frame in the sequence when in fact all frames make up a single scene.

In the present invention the scene changes after each frame are detected but if there are a plurality of consecutive scene changes these frames are treated as a single scene and only a single key frame is selected.

FIGS. 2a and 2b show a system in accordance with a preferred embodiment of the invention. The significant scene processor 230 detects scene changes. The fast motion detector 240 and counter 241 count the number of scene changes occurring consecutively, frame after frame. If a scene change occurs after each frame for a plurality of n frames the fast motion detector 240 uses counter 241 to keep track of either the number of scene changes or the number of frames having scene changes occurring after the frame. The fast motion detector 240 then informs the significant scene processor 230 that for n number of frames only select a single keyframe for the index as they are all part of the same scene.

FIG. 6 shows the sequence of frames of a fast motion car chase video scene. As stated above, in these frames the car moves from the left-hand portion of the frame to the right-hand portion of the frame. In a preferred embodiment of the instant invention the first frame is compared to the second frame. Since there is a large difference between the frames a scene change is detected after the first frame. Frame 2 is then compared to frame 3 and due to the large difference between these frames another scene change is detected between frame 2 and frame 3. Frame 3 is then compared to frame 4 and so on. The counter 241 increments each time a comparison between two frames yields a scene change. The number n is sent to processor 230 and the counter 241 is reset to zero once the comparison determines that no scene change has occurred. If the counter reaches 3 or more then a determination is made that the three or more frames are part of a fast motion sequence.

In another embodiment of the invention the method and device of the instant invention is used to detect fast motion scenes in a video by looking for portions of video having consecutive cuts detected frame after frame. This enables the location from an archive of fast motion scenes.

In addition if it is believed that a commercial has been detected because there is a high cut rate detected, then the present invention looks more closely at the cuts to determine if the cuts occur consecutively frame after frame which indicates a fast motion scene rather than a commercial. This enhances commercial location systems.

The present invention is shown using DCT coefficients; however, one may instead use representative values such as wavelet coefficients, histogram values or a function which operates on a sub-area of the image to give representative values for that sub-area.

Another embodiment of the invention pertains to the identification of fast motion scenes for the purpose of selecting keyframes therefrom for a video index. The method described above for identifying a plurality of consecutive cuts or scene changes is one method of identifying the fast motion scenes. Some other methods are identified in "Motion Analysis and Image Sequence Processing" edited by M. Ibramin Sezan and Reginald Lagendijk, Kluwer Academic Publishers, Boston/Dordrecht/London, 1993. Some of these methods include:

optical flow computation which tracks the flow of pixels from frame to frame;

motion estimation based on tracking where the edges in the image are moving from frame to frame;

motion estimation based on the rigid body motion model which tracks the flow of objects from frame to frame;

motion estimation using affine motion model which tracks local motion in a frame and which is a broad estimation of almost anything that moves from frame to frame; and using the number of intra coded blocks and motion vectors in P and B frames in MPEG.

If any of these methods detects a fast motion scene then one or more keyframes can be selected from the number of frames making up the fast motion scene. Whether or not the motion in a scene is fast or slow motion, can be determined by comparison to a threshold. If the motion detected by any of the methods is above the threshold then it is a fast motion scene. This threshold can be based on a comparison of all scenes in the video or a general threshold can be chosen which applies to all video or categories of video such as described in PHA 23,808, U.S. Ser. No. 09/433,258 filed Nov. 4, 1999. In one aspect of this embodiment of the invention, if there are a number of cuts detected within a group of frames then motion estimation is used to determine if the group of frames is a single fast motion scene so that only a single keyframe needs to be selected.

In addition, the present invention has been described with reference to a video indexing system, however it pertains in general to fast motion scenes and therefore can be used as a search device to detect scenes where fast motion causes erroneous scene change detections, or alternatively as an archival method to pick representative frames from a fast motion sequence.

While the invention has been described in connection with preferred embodiments, it will be understood that modifications thereof within the principles outlined above will be evident to those skilled in the art and thus, the invention is not limited to the preferred embodiments but is intended to encompass such modifications.

What is claimed is:

1. A system for detecting frames of fast motion scenes, comprising:

a receiver which receives source video having frames;

a comparator which detects video cuts between two frames; and a fast motion detector for detecting video cuts occurring after each frame of at least three consecutive frames of video, which indicates a fast motion scene rather than true video cuts.

2. A system as claimed in claim 1, further including a counter for counting the number of consecutive frames having video cuts detected thereafter.

3. A system as claimed in claim 2, further including a keyframe extractor for extracting a single key frame from the number of frames.

4. A system as claimed in claim 1, wherein the comparator includes a device for comparing the DCT coefficients of the frames to determine if a video cut has occurred between the two frames.

5. A method for detecting frames of fast motion scenes, comprising:

receiving source video having frames;

comparing the frames of video with each other to detect video cuts between the frames; and detecting fast motion by detecting at least three consecutive frames having video cuts detected after each frame indicating a fast motion scene rather than true video cuts.

6. The method as claimed in claim 5, further including the steps of counting the number of consecutive frames having video cuts detected thereafter.

7. The method as claimed in claim 6, further including the step of extracting a single key frame from the number of frames.

8. The method as claimed in claim 5, wherein the step of comparing compares the DCT coefficients of the frame and detects if a significant change occurred between the DCT coefficients of two frames.

9. An indexing system, comprising:

a receiver which receives source video having frames;

a fast motion detector which identifies a group of frames of video belonging to a fast motion scene, by detecting at least three consecutive video cuts which indicates a fast motion scene rather than true video cuts; and a selector which receives from the fast motion detector an indication of which group of frames belong to the fast motion scene; and which selects at least one key frame for an index from the group of frames.

10. The indexing system as claimed in claim 9, wherein the fast motion detector uses optical flow computation.

11. The indexing system as claimed in claim 9, wherein the fast motion detector uses an affine motion model.

12. The indexing system as claimed in claim 9, wherein the fast motion detector uses motion estimation based on edges.

13. The indexing system as claimed in claim 9, wherein the fast motion detector uses motion estimation based on rigid body motion.

14. The indexing system as claimed in claim 9, wherein the fast motion detector uses motion estimation based on the number of intra coded blocks in P and B frames in MPEG.

* * * * *